United States Patent [19]

Schmidt et al.

[11] Patent Number: 5,539,022
[45] Date of Patent: Jul. 23, 1996

[54] AQUEOUS DISPERSIONS OF ACRYLATE COPOLYMERS

[75] Inventors: Holger Schmidt, Wiesbaden; Tanja R. Brueck, Mainz-Kastel; Uwe Kubillus, Wiesbaden; Harald Oswald, Hofheim; Petra Schaub, Wiesbaden; Andrea Travers-Hemmer, Oestrich-Winkel, all of Germany

[73] Assignee: Hoechst Aktiengesellschaft, Germany

[21] Appl. No.: 222,674

[22] Filed: Apr. 4, 1994

[30] Foreign Application Priority Data

Apr. 5, 1993 [DE] Germany .......................... 43 11 128.9

[51] Int. Cl.$^6$ .......................................... C08K 3/20
[52] U.S. Cl. .................. 523/402; 523/400; 524/599; 524/700; 524/761; 524/765; 524/766; 524/767; 528/271; 528/361; 528/366; 528/392; 528/393
[58] Field of Search ........................... 524/548, 761, 524/765, 700, 811, 766, 767, 558, 599, 601, 604, 801, 845, 846; 528/271, 361, 366, 392, 393; 523/402, 400

[56] References Cited

U.S. PATENT DOCUMENTS

| 3,247,143 | 4/1966 | Masters et al. ...................... 524/765 X |
| 4,218,356 | 8/1980 | Evans et al. ........................ 524/811 X |
| 4,350,809 | 9/1982 | Fischer et al. ........................... 528/361 |
| 4,652,605 | 3/1989 | Chang et al. ....................... 524/765 X |
| 4,963,617 | 10/1990 | Fourquier et al. ................. 524/811 X |

FOREIGN PATENT DOCUMENTS

| 2556111 | 7/1976 | Germany . |
| 3128062 | 2/1983 | Germany ................................ 524/811 |

OTHER PUBLICATIONS

Copy of European Search Report ( 3 pages).

*Primary Examiner*—Judy M. Reddick
*Attorney, Agent, or Firm*—Bierman & Muserlian

[57] ABSTRACT

Water-dilutable dispersions of acrylate copolymers having a hydroxyl number of from 40 to 200 mg KOH/g and an acid number of from 15 to 50 mg of KOH/g, obtained by free-radical copolymerization of a) from 5 to 40 parts by weight of at least one glycidyl ester of an α-branched aliphatic saturated monocarboxylic acid, b) from 0 to 30 parts by weight of at least one diester of an α,β-olefinically unsaturated dicarboxylic acid, c) from 0 to 70 parts by weight of at least one vinyl aromatic hydrocarbon, the molar quantity of component c) always being greater than or equal to the molar quantity of component b), d) from 0 to 60 parts by weight of an alkyl ester of an α,β-olefinically unsaturated carboxylic acid, e) from 2 to 40 parts by weight of at least one α,β-olefinically unsaturated carboxylic acid, the molar quantity of component e) always being greater than the molar quantity of component a), f) from 5 to 40 parts by weight of at least one hydroxyalkyl ester of an α,β-olefinically unsaturated carboxylic acid, the polymerization being carried out in bulk or in solution; if desired, addition of a water-dilutable solvent, neutralization and dilution with water.

These dispersions are suitable as water-dilutable binders for clearcoat baking enamels or solid-color topcoat baking enamels.

11 Claims, No Drawings

AQUEOUS DISPERSIONS OF ACRYLATE COPOLYMERS

The invention relates to water-dilutable dispersions of acrylate copolymers and to processes for their preparation, and to their use in water-dilutable clearcoat baking enamels and water-dilutable solid-color topcoat baking enamels.

DE-A 29 42 327 and EP-A 0 056 971 have already disclosed acrylate copolymers which are employed as binders in conventional, solvent-containing coating materials.

However, for the basecoat/clearcoat process in the topcoat finishing of automobiles it is desirable for ecological reasons to use a water-dilutable clearcoat having as low as possible a content of organic auxiliary solvents. In addition to this, a further aim is to substitute conventional, solvent-containing solid-color topcoats by water-dilutable coating systems. The water-dilutable clearcoats and topcoats must have a solids content at spray viscosity which is high enough for one to two spray passes to give coating films of sufficient thickness which, after baking, give pit-free coating films of good appearance and of high resistance, in particular with respect to sulfuric acid, xylene and acetone.

Polyacrylate resins which are water-dilutable and can be employed in aqueous topcoats are described in DE-A 40 09 931. Monomers which are suitable for constructing these copolymers are alkyl acrylates, hydroxyalkyl acrylates, acrylic acid and styrene, but not the glycidyl esters of aliphatic saturated monocarboxylic acids. Water-dilutable paint binders based on acrylate copolymers are also disclosed in EP 496 079. It is essential for the polymers to comprise fluorine-containing monomers.

The invention relates to water-dilutable dispersions of acrylate copolymers having a hydroxyl number of from 40 to 200 mg of KOH/g, preferably from 80 to 160 mg of KOH/g, and an acid number of from 15 to 50 mg of KOH/g, obtained by free-radical bulk copolymerization of p1 a) from 5 to 40, preferably from 10 to 30, parts by weight of at least one glycidyl ester of an α-branched aliphatic saturated monocarboxylic acid, b) from 0 to 30 parts by weight of at least one diester of an α,β-olefinically unsaturated dicarboxylic acid having 1 to 8 carbon atoms in the ester group, c) from 0 to 70, preferably from 0 to 45, parts by weight of at least one vinyl aromatic hydrocarbon, the molar quantity of component c) always being greater than or equal to the molar quantity of component b), d) from 0 to 60, preferably from 10 to 40, parts by weight of an alkyl ester of an α,β-olefinically unsaturated carboxylic acid, preferably an alkyl or cycloalkyl (meth)acrylate which contains an alkyl or cycloalkyl radical having 1 to 18 carbon atoms, e) from 2 to 40 parts by weight of at least one α,β-olefinically unsaturated carboxylic acid, preferably (meth)acrylic acid, the molar quantity of component e) always being greater than the molar quantity of component a), f) from 5 to 40 parts by weight of at least one hydroxyalkyl ester of an α,β-olefinically unsaturated carboxylic acid, preferably an ester of (meth)acrylic acid with a polyhydric aliphatic alcohol having from 2 to 6 carbon atoms, dissolution of the copolymer with a water-dilutable auxiliary solvent, neutralization and dilution with water.

For the preparation of the acrylate copolymers it is possible to use as component a) glycidyl esters of an aliphatic saturated monocarboxylic acid having a tertiary or quaternary carbon atom in the α position. Particularly preferred are glycidyl esters of heavily branched monocarboxylic acids having a chain length of from 9 to 11 carbon atoms, as can be obtained for example under the tradename CARDURA®. During the preparation of the acrylate copolymers, component a) forms with component e) a reaction product which can be subjected to free-radical copolymerization with at least one of components b), c), d) and f).

Component b) comprises diesters of an α,β-olefinically unsaturated dicarboxylic acid having 1 to 8 carbon atoms in the ester group, preferably esters of maleic and fumaric acid such as dimethyl maleate, diethyl fumarate, dibutyl maleate and dibutyl fumarate.

As component c), compounds such as styrene, α-methylstyrene and (alkylphenyl)ethenes with alkyl radicals of 1 to 3 carbon atoms, for example vinyltoluene, can be employed.

Component d) comprises alkyl esters of an α,β-olefinically unsaturated carboxylic acid, preferably an alkyl or cycloalkyl (meth)acrylate which contains an alkyl or cycloalkyl radical having 1 to 18 carbon atoms, for example methyl (meth)acrylate, ethyl (meth)acrylate, propyl (meth)acrylate, butyl (meth)acrylate, hexyl (meth)acrylate, ethylhexyl (meth)acrylate, lauryl (meth)acrylate, stearyl (meth)acrylate, cyclohexyl (meth)acrylate, tert-butylcyclohexyl (meth)acrylate, trimethylcyclohexyl (meth)acrylate, isobornyl (meth)acrylate and dihydrodicyclopentadienyl (meth)acrylate. The viscosity-reducing effect of bulky, rigid monomers such as isobornyl (meth)acrylate, which effect has already been described in the literature, is also evident in the copolymers according to the invention.

Suitable components e) are α,β-olefinically unsaturated carboxylic acids such as (meth)acrylic acid, crotonic acid and monoesters of olefinically unsaturated dicarboxylic acids whose alcohol component in general has 1 to 18 carbon atoms, and unsaturated fatty acids having 8 to 22 carbon atoms such as, for example, linolenic acid, linoleic acid, oleic acid, arachidonic acid and ricinene fatty acid.

Compounds which are employed as component f) are hydroxyalkyl esters of an α,β-olefinically unsaturated carboxylic acid, such as esters of (meth)acrylic acid with polyhydric aliphatic alcohols having 2 to 6 carbon atoms. Examples which can be mentioned are 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, hexanediol mono(meth)acrylate and trimethylolpropane di(meth)acrylate.

The acrylate copolymer dispersions according to the invention are prepared by the bulk polymerization method. The term "bulk polymerization" refers to a polymerization which is generally carried out without solvent. In some cases, however, the presence of a small proportion of solvent of up to 5 parts by weight, preferably up to 3 parts by weight, is permissible. The polymerization is generally carried out by initially taking at least one portion of component a), on its own or together with at least one portion of component b), adding a mixture of components c) to f) and any residual component a) or b), together with a polymerization initiator and, if desired, with a regulator, at from 120° to 200° C., and reacting the mixture in a bulk polymerization until a degree of conversion of at least 95 and preferably at least 98% is reached. To prepare an aqueous dispersion, the resulting acrylate copolymer is first dissolved with from 5 to 35, preferably from 10 to 25 parts by weight of a water-dilutable organic auxiliary solvent and then partially or completely neutralized by adding the appropriate quantity of a base. It is also possible to add all or part of the organic auxiliary solvent together with components c) to f). The completely or partially neutralized acrylate copolymer is then converted into an aqueous dispersion by normal or inverted dilution with water. The individual monomers a) to f) are in each case employed in molar quantities such that the final acrylate copolymer has the hydroxyl numbers and acid numbers defined above.

Suitable polymerization initiators are all those which are conventional for free-radical copolymerizations, such as aliphatic azo compounds, for example azobis(isobutyronitrile) or azobis(2-methylbutyronitrile), diacyl peroxides, for example dibenzoyl peroxide, dialkyl peroxides, for example di-tert-butyl peroxide or di-tert-amyl peroxide, alkyl hydroperoxides, for example tert-butylhydroperoxide, or per esters, for example tert-butyl peroxybenzoate, tert-butyl peroxy-2-ethylhexanoate or tert-amyl peroxy-2-ethylhexanoate. Di-tert-butyl peroxide is preferred, in a quantity of from 0.5 to 5 parts by weight based on the total quantity of components a) to f).

Where the use of regulators is necessary in order to achieve particularly low average molecular masses, alcohols, for example butanol, or thiols, for example dodecanethiol, are used.

Suitable organic auxiliary solvents include water-dilutable mono- or polyhydric alcohols or glycols, for example ethanol, n-propanol, isopropanol, n-butanol, isobutanol, ethylene glycol, diethylene glycol, triethylene glycol, propylene glycol and glycerol, water-dilutable monoethers of polyhydric alcohols, for example methoxypropanol or methoxybutanol, and water-dilutable glycol ethers such as, for example, butyl glycol or butyl diglycol.

Both organic bases and inorganic bases can be used to neutralize the acid groups. It is preferred to employ primary, secondary and tertiary amines, for example ethylamine, propylamine, dimethylamine, triethylamine, dibutylamine, dimethylisopropylamine, cyclohexylamine, benzylamine, morpholine and piperidine, and particularly preferably amino alcohols, for example N,N-diethylaminoethanol, N,N-dimethylaminoethanol, ethanolamine, diethanolamine, triethanolamine, 2-amino-2-methylpropanol or 2-dimethylamino-2-methyl-1-propanol. Neutralization is effected such that dilution with water results in stable solutions or dispersions having a pH of between 6 and 10, preferably from 7 to 8.5.

The solids content of the aqueous dispersions is adjusted so that the dispersions are not too viscous and remain manageable in practice. Adjustment is made in general to solids contents of from 30 to 50% by weight.

From the water-dilutable dispersions of polyacrylate resins which are obtained in this way, water-dilutable clearcoat baking enamels or water-dilutable solid-color topcoat baking enamels are produced by methods which are generally known, by admixing an amino resin as crosslinking agent and, if desired, conventional paint additives such as catalysts, leveling agents and thickeners, flow assistants, pigments, pigment pastes, antifoams, wetting agents, fillers, light stabilizers, antioxidants and the like.

The water-dilutable clearcoat baking enamels or water-dilutable solid-color topcoat baking enamels preferably contain sufficient amino resin for the weight ratio between the polyacrylate resin and amino resin to be from 60:40 to 90:10, particularly preferably from 70:30 to 85:15.

It is possible in principle to employ as crosslinking agents any amino resin which can be processed with the polyacrylate resins to give a stable, water-dilutable clearcoat baking enamel or water-dilutable solid-color topcoat baking enamel. It is preferred to employ, as crosslinking agents, melamine-formaldehyde resins which are partially or completely etherified with aliphatic alcohols containing preferably 1 to 4 carbon atoms per molecule, for example MAPRENAL® MF 900 (Cassella), CYMEL® 303 (American Cyanamid), MAPRENAL® VMF 3921 w (Cassella) and MAPRENAL® VMF 3926 (Cassella).

Prior to application, the water-dilutable clearcoat baking enamels or water-dilutable solid-color topcoat baking enamels formulated with the dispersions of water-dilutable polyacrylate resins according to the invention are adjusted to the spray viscosity—generally from 20 to 40 s flow time from a DIN 4 cup (DIN 53 211)—and to a pH of from 7 to 9.

The solids content of the water-dilutable clearcoat baking enamels or water-dilutable solid-cover topcoat baking enamels formulated with the dispersions according to the invention is, at spray viscosity and with a relatively low proportion of organic auxiliary solvents, sufficient for one to two spray passes to give coating films of sufficient thickness (the thickness of the baked coating film should preferably be between 30 and 45 µm), which, after baking, give non-yellowing, pit-free coating films of good appearance and of high resistance, in particular with respect to sulfuric acid, xylene and acetone.

The water-dilutable clearcoat baking enamels formulated with the dispersions according to the invention are particularly suitable for producing metallic finishes by the basecoat/clearcoat process.

An advantage of the acrylate copolymers is that their preparation does not involve distilling off any solvents, and that water-dilutable binders of low average molecular mass can be prepared without the addition of regulators. This results in binders having a high solids content and a low proportion of organic auxiliary solvents.

One advantage of the dispersions over known, water-dilutable binders is the extremely high resistance to inorganic acids, especially sulfuric acid, of the water-dilutable clearcoat baking enamels or water-dilutable solid-color topcoat baking enamels formulated using these dispersions. The sulfuric acid resistance of the water-dilutable coatings, which is used as a test of resistance to environmental effects such as "acid rain", is in many cases even better—when using the binders according to the invention—than that of conventional coatings. In combination with highly reactive, partially etherified melamine-formaldehyde resins, the resistance values found with respect to organic agents such as xylene and acetone are extremely good, far exceeding those of conventional coating systems. A further advantage of the binders according to the invention is to be seen in their high stability to yellowing when used in one-component baking enamels in combination with amino resins.

It should be noted, moreover, that the baking enamels produced using the dispersions according to this invention have good water resistance without the addition, described in DE-A 40 27 594, of fluorinated compounds and without free or blocked polyisocyanates. This constitutes an ecological advantage.

In the examples which follow the invention is illustrated in more detail. All parts and percentages are by weight unless expressly stated otherwise.

EXAMPLES 1a–1f

The esters I are placed in a reflux apparatus and heated at 180° C. The monomer mixture II, with the initiator III dissolved therein (see Table 1) is then metered in under nitrogen at a uniform rate over a period of 8 hours. The mixture is then left to react subsequently for 2 hours at the same temperature. Then the mixture is cooled to about 130° C. before commencing the addition of the solvent IV. When the addition is complete the mixture is cooled to 80° C., and the neutralizing amine V is added over the course of 1 hour and then the deionized water VI over the course of 2 hours, with stirring. The mixture is then cooled to 25° C. with stirring and filtered.

EXAMPLE 1g 24.9 parts by weight of the glycidyl ester of Versatic acid are placed in a reflux apparatus and heated at 160° C. Over a period of 8 hours a mixture of 10.3 parts of n-butyl methacrylate, 14.2 parts of 2-hydroxyethyl methacrylate, 18.3 parts of isobornyl acrylate, 15.6 parts of methacrylic acid, 16.7 parts of methyl methacrylate, 2 parts of tert-butyl peroxy-2-ethylhexanoate and 15 parts of 1-butanol are metered in at a uniform rate under nitrogen. During this time the reaction temperature falls continuously to a final value of from 130° to 135° C. The mixture is then left to react subsequently at this temperature for 2 hours. It is cooled to 80° C., and 7.1 parts of triethanolamine are added over the course of 1 hour and then 125.9 parts of deionized water over the course of 2 hours, with stirring. The mixture is cooled to 25° C. with stirring and filtered.

TABLE 1

| Designation | 1a | 1b | 1c | 1d | 1e | 1f |
|---|---|---|---|---|---|---|
| | Parts by weight | | | | | |
| I | | | | | | |
| Diethyl maleate | | | | | | 5.6 |
| Glycidyl ester of Versatic acid | 24.6 | 17.2 | 25.1 | 20.2 | 14.1 | 13.4 |
| II | | | | | | |
| Acrylic acid | 9.9 | 8.2 | | 9.0 | | 7.1 |
| n-Butyl acrylate | | | | 15.2 | | |
| n-Butyl methacrylate | 13.0 | | 10.4 | | | |
| 2-Ethylhexyl acrylate | | 20.8 | | | | |
| 4-Hydroxybutyl acrylate | | 23.9 | | | 19.7 | 18.8 |
| 2-Hydroxyethyl acrylate | 17.3 | | | | 9.8 | 9.3 |
| 2-Hydroxyethyl methacrylate | | | | 9.5 | | |
| 2-Hydroxypropyl acrylate | | | | | 9.6 | |
| Isobornyl acrylate | | | 18.3 | 23.0 | | |
| Isobornyl methacrylate | | | | | 30.4 | 29.1 |
| Methacrylic acid | | | | 14.5 | | 8.8 |
| Methyl methacrylate | 17.9 | | 22.2 | | 17.2 | 6.5 |
| Styrene | 17.3 | 29.9 | | 23.0 | | 10.2 |
| III | | | | | | |
| Di-tert-butyl | 1.5 | 1.5 | 1.5 | 1.5 | 1.5 | 1.5 |

TABLE 1-continued

| Designation | 1a | 1b | 1c | 1d | 1e | 1f |
|---|---|---|---|---|---|---|
| | Parts by weight | | | | | |
| peroxide | | | | | | |
| IV | | | | | | |
| 1-Butanol | 25.0 | | | 42.9 | | 25.0 |
| 3-Methoxy-1-butanol | | 17.7 | | | 11.1 | |
| 1,2-Propylene glycol | | | 33.3 | | | |
| V | | | | | | |
| N,N-Dimethylaminoethanol | | 2.4 | | 2.3 | | |
| 2-Amino-2-methyl-1-propanol | 2.6 | | | | 2.4 | 2.4 |
| Triethanolamine | | | 4.4 | | | |
| VI | | | | | | |
| Water | 122.4 | 143.1 | 100.4 | 87.4 | 108.7 | 99.9 |

The properties of the polyacrylate resins prepared in Example 1 can be taken from Table 2.

TABLE 2

| Designation | 1a | 1b | 1c | 1d | 1e | 1f | 1g |
|---|---|---|---|---|---|---|---|
| Acid number (relates to SC*, calc.) | 16.3 | 21.2 | 32.9 | 20.7 | 23.0 | 22.0 | 40.8 |
| Hydroxyl number (relates to SC*, calc.) | 144.4 | 135.4 | 102.9 | 91.0 | 153.6 | 146.5 | 122.4 |
| Dilution (%, calc.) | 80.0 | 85.0 | 75.0 | 70.0 | 90.0 | 80.0 | 85.0 |
| Degree of neutralization (%) | 100.0 | 70.0 | 50.0 | 70.0 | 65.0 | 70.0 | 65.0 |
| Solids content (%, calc.) | 40.0 | 38.0 | 42.0 | 43.0 | 45.0 | 44.0 | 40.0 |
| Viscosity (23° C., mPa.s) | 1930 | 780 | 3160 | 2890 | 2140 | 2610 | 3200 |
| $M_w$ (g/mol) | 42500 | 38800 | 15200 | 28700 | 22300 | 25600 | 37800 |

*SC = solids content

Dispersion 1f was used to produce the coatings described in Examples 2 to 17 below. The measured properties of these coatings are given in the respective examples. Comparable properties were measured for those coatings which contain, as binder, a dispersion according to Examples 1a to 1e, and 1g.

EXAMPLE 2

Aqueous 1-component solid-color topcoat baking enamel based on a resin from Example 1

About 60 parts of the dispersion are mixed with 0.9 part of Additol® XL 250 (wetting agent, 0.5% based on overall coating), 0.4 part of Additol® VXW 4973 (antifoam, 0.2% based on overall coating), 40.2 parts of titanium dioxide CL 2310® (pigment, pigment/binder ratio: 100:70) and 6 parts of deionized water, and dispersed for 20 minutes in a bead mill (2 mm beads) at 6,000 rpm, with cooling, and a premix of 11.5 parts of Maprenal® MF 904 (crosslinking agent, 100%), 0.3 part of Additol® XW 390 (leveling agent, 0.5% based on overall coating), 0.67 part of Nacure® 2500 (catalyst, 25% in water, 2% based on melamine resin) and 9.1 parts of deionized water is added with gentle stirring. The coating is degassed, coated onto metal sheets at a wet-film thickness of 150 μm, and baked in a temperature gradient oven between 100° and 160° C. for 20 minutes.

|  | 100° C. | 110° C. | 120° C. | 130° C. | 140° C. | 150° C. | 160° C. |
|---|---|---|---|---|---|---|---|
| Pendulum hardness [s] | 60 | 75 | 139 | 178 | 182 | 188 | 189 |
| Acetone resistance after 30s/max. resistance [min] | 5 | 5 | 5 | 3 | 0/>3 | 0/>15 | 0/>30 |
| Xylene resistance [min] | <1 | <1 | <3 | >30 | >30 | >30 | >30 |
| Sulfuric acid resistance 1 h RT, 37%* | 1 | 1 | 0–1 | 0 | 0 | 0 | 0 |
| Gloss 20° [%] | 78 | 84 | 85 | 84 | 84 | 84 | 84 |

EXAMPLE 3

Example 2 is repeated, but now using 13.5 parts of Maprenal® VMF 3921 w (crosslinking agent, 85% in water) without catalyst, and a total of 13.8 parts of deionized water.

|  | 110° C. | 110° C. | 120° C. | 130° C. | 140° C. | 150° C. | 160° C. |
|---|---|---|---|---|---|---|---|
| Pendulum hardness [s] | 179 | 197 | 199 | 196 | 196 | 194 | 196 |
| Acetone resistance after 30s/max. resistance [min] | 5 | 0/>1 | 0/>5 | 0/>30 | 0/>60 | 0/>60 | 0/>60 |
| Xylene resistance [min] | >30 | >30 | >30 | >30 | >30 | >30 | >30 |
| Sulfuric acid resistance 1 h RT, 37% | 1 | 0 | 0 | 0 | 0 | 0 | 0 |
| Gloss 20° [%] | 87 | 84 | 83 | 80 | 80 | 76 | 77 |

EXAMPLE 4

Example 2 is repeated with the following changes: instead of Maprenal® MF 904, 15.3 parts of Maprenal® VMF 3926 (crosslinking agent, 75% in isobutanol) without catalyst, and a total of 12 parts of deionized water, are used.

|  | 110° C. | 110° C. | 120° C. | 130° C. | 140° C. | 150° C. | 160° C. |
|---|---|---|---|---|---|---|---|
| Pendulum hardness [s] | 183 | 196 | 198 | 196 | 196 | 194 | 193 |
| Acetone resistance after 30s/max. resistance [min] | 5 | 0/>2 | 0/>5 | 0/>20 | 0/>25 | 0/>25 | 0/>25 |
| Xylene resistance [min] | >20 | >20 | >20 | >20 | >20 | >20 | >20 |
| Sulfuric acid resistance 1 h RT, 37% | 1 | 0 | 0 | 0 | 0 | 0 | 0 |
| Gloss 20° [%] | 83 | 82 | 82 | 80 | 80 | 78 | 77 |

EXAMPLE 5

Example 2 is repeated with the following changes: instead of Maprenal® MF 904, 15.3 parts of Maprenal® MF 920 (crosslinking agent, 75% in water) and a total of 12 parts of deionized water are used.

|  | 110° C. | 110° C. | 120° C. | 130° C. | 140° C. | 150° C. | 160° C. |
|---|---|---|---|---|---|---|---|
| Pendulum hardness [s] | 177 | 191 | 191 | 190 | 184 | 183 | 190 |
| Acetone resistance after 30s/max. resistance [min] | 5 | 0/>4 | 0/>30 | 0/>30 | 0/>60 | 0/>60 | 0/>60 |
| Xylene resistance [min] | >30 | >30 | >30 | >30 | >30 | >30 | >30 |
| Sulfuric acid resistance 1 h RT, 37% | 1 | 0 | 0 | 0 | 0 | 0 | 0 |
| Gloss 20° [%] | 86 | 84 | 80 | 77 | 70 | 69 | 69 |

EXAMPLE 6

Example 2 is repeated with the following changes: instead of Maprenal® MF 904, 15.3 parts of Maprenal® MF 915 (crosslinking agent, 75% in isobutanol) without catalyst, and a total of 13.4 parts of deionized water, are used.

|  | 100° C. | 110° C. | 120° C. | 130° C. | 140° C. | 150° C. | 160° C. |
|---|---|---|---|---|---|---|---|
| Pendulum hardness [s] | 127 | 171 | 179 | 181 | 182 | 185 | 182 |
| Acetone resistance after 30s/max. resistance [min] | 5 | 5 | 5 | 4 | 4 | 0/<1 | 0/<1 |
| Xylene resistance [min] | 0.5 | 0.5 | <2 | <5 | <5 | <25 | <30 |
| Sulfuric acid resistance 1 h RT, 37% | 0 | 0 | 0 | 0 | 0 | 0 | 0 |
| Gloss 20° [%] | 82 | 81 | 79 | 78 | 76 | 73 | 70 |

EXAMPLE 7

Conventional 1-component solid-color topcoat baking enamel based on Alftalat® AC 451 n/AR 280/Maprenal® MF 915

33.91 parts of an isononanoic acid alkyd (Alftalat® AC 451 n, 70% in Solvesso 100/Solvesso 150), 6.61 parts of a ricinene alkyd (Alftalat® AR280, 60% in xylene), 27.71 parts of titanium dioxide Kronos CL2310, 0.3 part of Aerosil® 380 (thixotropic agent, antideposition agent) and 10 parts of xylene are placed in a bead mill and milled for 30 minutes at 6,000 rpm and 50° C. down to a grindometer value of below 8 μm, before adding 15.83 parts of a partially etherified melamine-formaldehyde resin (Maprenal® MF 915, 75% in isobutanol, crosslinking agent), 0.69 part of isononyl alcohol, 2.77 parts of Solvesso 100, 1.59 parts of xylene and 0.1 part of Additol® XL 480 (leveling agent).

|  | 100° C. | 110° C. | 120° C. | 130° C. | 140° C. | 150° C. | 160° C. |
|---|---|---|---|---|---|---|---|
| Pendulum hardness [s] | 52 | 103 | 129 | 138 | 143 | 152 | 155 |
| Acetone resistance after 30s/max. resistance [min] | 5 | 5 | 5 | 5 | 5 | 4 | 3 |
| Xylene resistance [min] | <1 | <1 | <1 | <2 | <4 | <25 | <25 |
| Sulfuric acid resistance 1 h RT, 37% | 2 | 2 | 0 | 0 | 0 | 0 | 0 |
| Gloss 20° [%] | 85 | 85 | 85 | 82 | 81 | 79 | 79 |

EXAMPLE 8

Aqueous 1-component clearcoat baking enamel based on a resin from Example 11

0.35 part of Additol®XW 392 in the form supplied (leveling agent) is added to 1.86 parts of a partially etherified melamine-formaldehyde resin dissolved with water (Maprenal® VMF 3921 w, 85% in water, crosslinking agent). 96.4 parts of dispersion If are added to this mixture (binder/melamine resin ratio, solid to solid: 80:20). Subsequently 10 parts of a 1:1 mixture of water are used to adjust the spray viscosity to 18–20 s flow time from a DIN 4 cup at 23° C. If necessary, the pH is adjusted to 8 using dimethylethanolamine. The coating is degassed, coated onto metal sheets at a wet-film thickness of 150 μm, and baked in a temperature gradient oven between 100° and 160° C. for 20 minutes.

EXAMPLE 9

Example 8 is repeated with the following changes: instead of 11.8 parts of Maprenal® VMF 3921 w, 13.3 parts of a partially methylated melamine-formaldehyde resin dissolved in isobutanol (Maprenal® VMF 3926, 75% in isobutanol, crosslinking agent) and 28 parts instead of 11 parts of deionized water are used.

|  | 100° C. | 110° C. | 120° C. | 130° C. | 140° C. | 150° C. | 160° C. |
|---|---|---|---|---|---|---|---|
| Pendulum hardness [s] | 169 | 209 | 211 | 208 | 207 | 210 | 208 |
| Acetone resistance after 30s/max. resistance [min] | 0.3 | 1.3 | 16 | 23 | 23 | 23 | 23 |
| Xylene resistance [min] | 0.13 | 5 | >6 < 21 | >6 < 21 | >6 < 21 | >6 < 21 | >6 < 21 |
| Sulfuric acid resistance 1 h RT, 37% | 0 | 0 | 0 | 0 | 0 | 0 | 0 |

|  | 100° C. | 110° C. | 120° C. | 130° C. | 140° C. | 150° C. | 160° C. |
| --- | --- | --- | --- | --- | --- | --- | --- |
| Pendulum hardness [s] | 173 | 209 | 211 | 211 | 210 | 209 | 206 |
| Acetone resistance after 30s/max. resistance [min] | 0.02 | 0.04 | 7.75 | 12 | 13 | 13.25 | 13.25 |
| Xylene resistance [min] | 0.05 | 5 | >6 < 21 | >6 < 21 | >6 < 21 | >6 < 21 | >6 < 21 |
| Sulfuric acid resistance 1 h RT, 37% | 0 | 0 | 0 | 0 | 0 | 0 | 0 |

EXAMPLE 10

Example 8 is repeated with the following changes: instead of 11.8 parts of Maprenal® VMF 3921 w, 10 parts of a fully etherified melamine-formaldehyde resin (Maprenal® MF 900, 100%, crosslinking agent) and 19 parts instead of 14.4 parts of deionized water are used.

|  | 100° C. | 110° C. | 120° C. | 130° C. | 140° C. | 150° C. | 160° C. |
| --- | --- | --- | --- | --- | --- | --- | --- |
| Pendulum hardness [s] | 69 | 131 | 170 | 186 | 203 | 216 | 222 |
| Acetone resistance after 30s/max. resistance [min] | <0.5 | <0.5 | <0.5 | <0.75 | <0.75 | <0.75 | <0.75 |
| Xylene resistance [min] | <0.008 | <0.008 | <0.008 | <0.008 | <0.008 | <0.05 | <0.05 |
| Sulfuric acid resistance 1 h RT, 37% | 2 | 2 | 1 | 1 | 1 | 0 | 0 |

EXAMPLE 11

Example 10 is repeated, using 0.19 part of a catalyst (Nacure® 2500, in the form supplied, 2% based on the quantity of melamine resin) and 19 parts instead of 18 parts of deionized water.

|  | 100° C. | 110° C. | 120° C. | 130° C. | 140° C. | 150° C. | 160° C. |
| --- | --- | --- | --- | --- | --- | --- | --- |
| Pendulum hardness [s] | 73 | 133 | 177 | 201 | 212 | 208 | 207 |
| Acetone resistance after 30s/max. resistance [min] | <0.5 | <0.5 | <0.5 | <0.5 | 3.5 | 13 | 17 |
| Xylene resistance [min] | 0.02 | 0.02 | 0.06 | 0.3 | 5 | 6 | 6 |
| Sulfuric acid resistance 1 h RT, 37% | 2 | 2 | 1 | 0 | 0 | 0 | 0 |

EXAMPLE 12

Example 8 is carried out with the following changes: the crosslinking agent employed is 13.3 parts of a partially methylated, moderately reactive melamine-formaldehyde resin (Maprenal® Mf 915, 75% in isobutanol, crosslinking agent) with 25 parts of deionized water.

|  | 100° C. | 110° C. | 120° C. | 130° C. | 140° C. | 150° C. | 160° C. |
| --- | --- | --- | --- | --- | --- | --- | --- |
| Pendulum hardness [s] | 148 | 202 | 212 | 211 | 210 | 211 | 208 |
| Acetone resistance after 30s/max. resistance [min] | <0.5 | <0.5 | <0.5 | <0.5 | 2 | 5 | 6.25 |
| Xylene resistance [min] | 0.05 | 0.2 | 2 | 2 | 2.75 | >6 < 21 | >6 < 21 |
| Sulfuric acid resistance 1 h RT, 37% | 1 | 1 | 1 | 1 | 0 | 0 | 0 |

EXAMPLE 13

Example 12 is repeated, using 0.19 part of a catalyst (Nacure®2500, in the form supplied, 2% based on the total quantity of melamine resin) and 28 parts of deionized water.

|  | 100° C. | 110° C. | 120° C. | 130° C. | 140° C. | 150° C. | 160° C. |
|---|---|---|---|---|---|---|---|
| Pendulum hardness [s] | 153 | 200 | 209 | 208 | 209 | 205 | 204 |
| Acetone resistance after 30s/max. resistance [min] | <0.5 | <0.5 | <0.5 | <0.75 | 4.5 | 9.25 | 10 |
| Xylene resistance [min] | 0.05 | 0.06 | 2 | 2.83 | >6 < 21 | >6 < 21 | >6 < 21 |
| Sulfuric acid resistance 1 h RT, 37% | 1 | 1 | 0 | 0 | 0 | 0 | 0 |

EXAMPLE 14

Example 8 is carried out with the quantity of melamine resin varied, namely using 20.1 parts of the partially etherified melamine-formaldehyde resin dissolved with water (Maprenal® VMF 3921 w, 35% in water, crosslinking agent) (binder/melamine resin ratio: 70:30).

| Pendulum hardness on metal gradient sheet 20 min/100–160° C. | | | | | | | |
|---|---|---|---|---|---|---|---|
| VMF 3921 w | 100° C. | 110° C. | 120° C. | 130° C. | 140° C. | 150° C. | 160° C. |
| 70:30 | 167 s | 201 s | 205 s | 201 s | 203 s | 198 s | 200 s |
| Acetone resistance on metal gradient sheet 20 min/100–160° C. | | | | | | | |
| VMF 3921 w | 100° C. | 110° C. | 120° C. | 130° C. | 140° C. | 150° C. | 160° C. |
| 70:30 | <30" | 3' | 33' | >40' | >40' | >40' | >40' |
| Sulfuric acid resistance 1 h RT. 37% | 0 | 0 | 0 | 0 | 0 | 0 | 0 |

EXAMPLE 15

Example 8 is carried out using 31.4 parts of Maprenal® VMF 3921 w (binder/melamine resin ratio: 60:40).

| Pendulum hardness on metal gradient sheet 20 min/100–160° C. | | | | | | | |
|---|---|---|---|---|---|---|---|
| VMF 3921 w | 100° C. | 110° C. | 120° C. | 130° C. | 140° C. | 150° C. | 160° C. |
| 60:40 | 132 s | 191 s | 197 s | 201 s | 204 s | 204 s | 201 s |
| Acetone resistance on metal gradient sheet 20 min/100–160° C. | | | | | | | |
| VMF 3921 w | 100° C. | 110° C. | 120° C. | 130° C. | 140° C. | 150° C. | 160° C. |
| 60:40 | <20" | 4'30" | >40' | >40' | >40' | >40' | >40' |
| Sulfuric acid resistance 1 h RT, 37% | 1 | 0 | 0 | 0 | 0 | 0 | 0 |
| Pendulum hardness on metal gradient sheet 20 min/100–160° C. | | | | | | | |
| VMF 3921 w | 100° C. | 110° C. | 120° C. | 130° C. | 140° C. | 150° C. | 160° C. |
| 90:10 | 150 s | 195 s | 203 s | 203 s | 205 s | 204 s | 205 s |
| Acetone resistance on metal gradient sheet 20 min/100–160° C. | | | | | | | |
| VMF 3921 w | 100° C. | 110° C. | 120° C. | 130° C. | 140° C. | 150° C. | 160° C. |
| 90:10 | <30" | <30" | 30" | 30" | 30" | 45" | 45" |
| Sulfuric acid resistance 1 h RT, 37% | 0 | 0 | 0 | 0 | 0 | 0 | 0 |

EXAMPLE 17

Clearcoat based on conventional acrylic baking and an n-butylated melamine resin 46.67 parts of a standard acrylic baking resin Synthacryl® SC 370, 75% in Solvesso® 100, 53.85 parts of an acrylic baking resin Synthacryl® SC 303, 65% in xylene/butanol, 44.78 parts of an n-butylated melamine resin (Maprenal® VMF 3610, crosslinking agent, 67% in butanol/xylene, 1 part of a HALS product (Tinuvin® 292, free-radical scavenger), 1 part of a UV absorber (Tinuvin® 1130, UV absorber), 10 parts of isobutanol, 6 parts of Solvesso® 150, 18 parts of white spirit (b.p. 145° to 180 ° C.), 44 parts of Solvesso® 100 and 0.23 part of Additol® XL 121 (slip additive) are mixed, the resulting clearcoat having a flow time of 25 seconds and a solids content at processing of about 43%.

|  | 100° C. | 110° C. | 120° C. | 130° C. | 140° C. | 150° C. | 160° C. |
|---|---|---|---|---|---|---|---|
| Pendulum hardness [s] | 45 | 68 | 122 | 152 | 160 | 163 | 162 |
| Acetone resistance after 30s/max. | <0.5 | <0.5 | <0.5 | <0.5 | <0.5 | <1 | >1 < 2 |

| | 100° C. | 110° C. | 120° C. | 130° C. | 140° C. | 150° C. | 160° C. |
|---|---|---|---|---|---|---|---|
| resistance [min] | | | | | | | |
| Xylene resistance [min] | <1 | <1 | <1 | <3 | >5 < 10 | >20 < 25 | >20 < 25 |
| Sulfuric acid resistance 1 h RT, 37% | 2 | 2 | 1 | 1 | 1 | 0 | 0 |

We claim:

1. An aqueous dispersion of an acrylate copolymer having a hydroxyl number of from 40 to 200 mg of KOH/g and an acid number of from 15 to 50 mg of KOH/g, obtained by carrying out the following steps: (1) free-radical copolymerization of
   a) from 5 to 40 parts by weight of at least one glycidyl ester of an e-branched aliphatic saturated monocarboxylic acid,
   b) from 0 to 30 parts by weight of at least one diester of an $\alpha,\beta$-olefinically unsaturated dicarboxylic acid having 1 to 8 carbon atoms in the ester group,
   c) from 0 to 70 parts by weight of at least one vinyl aromatic hydrocarbon, the quantity of component c) always being greater than or equal to the quantity of component b),
   d) from 0 to 60 parts by weight of an alkyl ester or cycloalkyl ester of an $\alpha,\beta$-olefinically unsaturated carboxylic acid which contains an alkyl or cycloalkyl of up to 18 carbon atoms,
   e) from 2 to 40 parts by weight of at least one $\alpha,\beta$-olefinically unsaturated carboxylic acid the quantity of component e) always being greater than the quantity of component a),
   f) from 5 to 40 parts by weight of at least one hydroxyalkyl ester of an $\alpha,\beta$-olefinically unsaturated carboxylic acid,
the copolymerization being carried out in bulk or in the presence of a water-dilutable solvent; (2) optionally addition of a water-dilutable solvent, (3) neutralization and (4) dilution with water.

2. An aqueous dispersion as claimed in claim 1, wherein the acrylate copolymer is obtained by free-radical copolymerization of a glycidyl ester of a monocarboxylic acid having a tertiary or quaternary $\alpha$-carbon atom and having 9 to 11 carbon atoms as component a).

3. An aqueous dispersion as claimed in claim 1, wherein the acrylate copolymer is obtained by free-radical copolymerization of isobornyl (meth)acrylate as component d).

4. An aqueous dispersion as claimed in claim 1, which comprises carrying out the polymerization in a water-dilutable solvent whose mass is from 5 to 35% of the sum of the masses of polymer and solvent, and which is added in whole or in part together with monomers c) to f).

5. The dispersion of claim 4 wherein the mass is 10 to 25%.

6. The dispersion of claim 1 wherein the hydroxyl number is 80 to 160 mg of KOH/g.

7. The dispersion of claim 1 wherein component d) is 0 to 45 parts by weight of an alkyl or cycloalkyl (meth)acrylate.

8. The dispersion of claim 1 wherein the amount of component c) is 0 to 45 parts by weight.

9. The dispersion of claim 1 wherein the amount of component a) is 10 to 30 parts by weight.

10. The dispersion of claim 1 wherein component e) is (meth)acrylic acid.

11. The dispersion of claim 1 wherein component f) is an ester of (meth)acrylic acid and a polyhydric aliphatic alcohol of 2 to 6 carbon atoms.

* * * * *